United States Patent Office 3,228,940
Patented Jan. 11, 1966

3,228,940
6-METHYL- AND 1,6-DIMETHYL-ERGOLINE NITRILES
Germano Bosisio, Onofrio Goffredo, and Silvio Redaelli, Milan, Italy, assignors to Società Farmaceutici Italia, Milan, Italy, a corporation of Italy
No Drawing. Filed Nov. 13, 1962, Ser. No. 237,366
Claims priority, application Italy, Nov. 14, 1961, 20,436/61
9 Claims. (Cl. 260—285.5)

Our invention relates to 6-methyl- and 1,6-dimethyl-ergoline derivatives which are per se pharmacologically active, as well as being intermediates in the synthesis of other pharmacologically active products. Our invention provides as new compounds, the 8-cyano derivatives of 6-methyl- and 1,6-di-methyl-ergoline having the following structural formula:

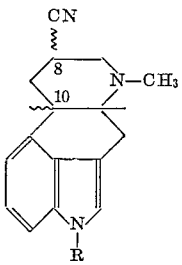

wherein R is a hydrogen atom or a methyl group and both the cyano-group in the 8-position and the hydrogen atom in the 10-position have either the α- or the β-, but not the same configuration.

The new compounds of the invention are pharmacologically active substances, and are of particular interest as intermediates for the synthesis of other therapeutically useful substances. For instance, by reducing the nitrile of dihydro-lysergic acid or its 1-methyl derivative (both new compounds of the invention) with lithium aluminum hydride or with sodium and ethanol, dihydro-D-lysergamine and 1-methyl-dihydro-D-lysergamine respectively are obtained, which compounds are useful as oxytocic substances or as intermediates for the preparation of the corresponding amides which have a high oxytocic activity. Our invention includes pharmaceutical compositions containing the derivatives of the invention and known therapeutically acceptable solid or liquid diluents or carriers.

The process for the preparation of the new compounds of our invention is based on the dehydration of 8-carboxamidoergolines having the following formula:

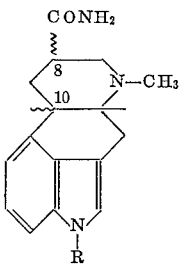

wherein R and the configurations at the 8- and 10-carbon atoms are as above.

The 6-methyl- and 1,6-dimethyl-8-carboxamidoergoline starting materials for the process of the invention, may be in either D- or L-form or the corresponding racemic mixture.

The symbols I and II, which follow the names of the new ergoline derivatives of the invention, indicate that the hydrogen atom in the 10-position has the α- or β-configuration respectively.

The starting 6-methyl- or 1,6-dimethyl-8-carboxamido-ergoline dissolved in a tertiary amine, such as pyridine and its homologues or dimethylaniline, is dehydrated with an arylsulfohalide, preferably p-toluenesulfochloride to yield the corresponding nitrile, which is then separated and purified in known manner. The dehydration takes place at room temperature, preferably at from 25° C. to 35° C., the mixture thereafter being kept at a temperature from 50° C. to 100° C., in the presence of the tertiary amine in which the starting amide is in suspension, for some hours to complete the reaction.

We have found that the best results are obtained with from 2 to 4 mols of arylsulfohalide per 1 mol of amide.

The nitrile obtained is separated in known manner. Upon completion of the reaction, the reaction mixture containing the nitrile is preferably poured into ice-water and the nitrile is extracted with a water-immiscible solvent, preferably a halogenated solvent, such as chloform or methylene dichloride. After evaporating off the solvent, the residue consisting of crude nitrile is purified either by crystallization from an organic solvent or by transformation into its iodomethylate or iodoethylate.

The following examples are to illustrate, but not limit, the invention.

*Example 1.—Nitrile of dihydrolysergic acid I (6-methyl-8β-cyano-ergoline II)*

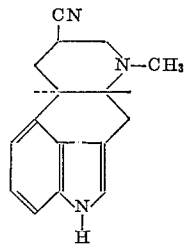

A solution of 4.32 g. of p-toluenesulfochloride in 24 cc. of anhydrous pyridine is added in 5 minutes to a suspension of 3 g. of dihydrolysergamide I, prepared as described by Stoll and Hofman (Helv. Chim. Acta, 1946, 29, 635), in 24 cc. of anhydrous pyridine. During the addition, which is carried out while rapidly stirring the mixture, a slight evolution of heat is observed (starting temperature: 29° C., final temperature: 32° C.). Heating the mixture on an oil bath, the internal temperature is brought to 68° C. over a period of 15 minutes and here it is kept for a further 45 minutes. When the mixture is at 50° C. complete dissolution is achieved and is followed (after a few minutes) by the separation of a crystalline precipitate. After cooling, the suspension is poured into a separating funnel containing ice-water and extracted several times with chloroform.

Brownish chloroform extracts are collected and washed with water, dried over anhydrous sodium sulfate and evaporated to dryness in vacuo. The solid crude brown colored residue weighing 1.950 g., is dissolved in warm acetone and decolorized with charcoal. The acetone solution, concentrated to small volume and then diluted with petroleum ether, crystallizes in two successive crops (1.350 g.). The nitrile of dihydrolysergic acid I produced melts at 273–276° C. (with decomposition); $[\alpha]_D^{20} = -93°$ (c.=0.34 in pyridine).

The mother liquors of the chloroform extractions are made alkaline to thymol-phthalein with 40° Bé. sodium hydroxide and thereafter extracted with chloroform. The chloroform extracts are collected, dried over anhydrous sodium sulfate and evaporated to dryness in vacuo. The solid residue (0.620 g.) is unreacted dihydrolysergamide I.

*Example 2.—Nitrile of 1-methyl-dihydrolysergic acid I (1,6-dimethyl-8β-cyano-ergoline I)*

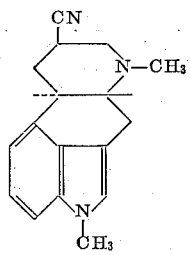

The process is carried out as in Example 1, starting from the amide of 1-methyl-dihydrolysergic acid I, prepared as described by Troxler and Hofmann (Helv. Chim. Acta, 1957, 40, 1721).

The resulting nitrile of 1-methyl-dihydrolysergic acid I melts at 190–192° C. (with decomposition); $[\alpha]_D^{20} = -96°$ (c.=0.1 in pyridine).

*Example 3.—Nitrile of dihydroisolysergic acid II (6-methyl-8α-cyano-ergoline II)*

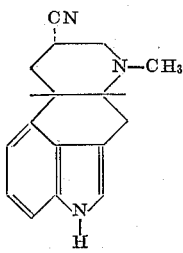

The starting dihydroisolysergamide II is prepared by hydrogenating the amide of isolysergic acid with Adams platinum in acetic acid. It melts at 211–212° C. (with decomposition); $[\alpha]_D^{20} = +30°$ (c.=0.3 in pyridine).

From 2.45 g. of this dihydroisolysergamide II, in 20 cc. of anhydrous pyridine, by the addition of 3.53 g. of p-toluenesulfochloride in 20 cc. of anhydrous pyridine, as described in Example 1, 2 g. of nitrile of dihydroisolysergic acid II are obtained. Its iodomethylate melts at 250–251° C. (with decomposition); $[\alpha]_D^{20} = +65°$ (c.=0.1 in water).

The water remaining after the chloroform extraction, is made alkaline to thymol-phthalein with 40° Bé. sodium hydroxide and extracted with chloroform, to recover 0.250 g. of the starting material.

*Example 4.—Nitrile of 1-methyl-dihydroisolysergic acid II (1,6-dimethyl-8α-cyano-ergoline II)*

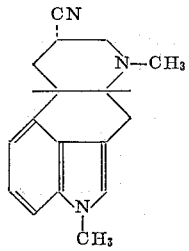

The process is carried out as in Example 1 starting from 1-methyl-dihydroisolysergamide II; melting point =205–206° C., $[\alpha]_D^{20} = +70°$ (c.=1 in dimethylformamide) obtained by methylation with methyl iodide in liquid ammonia in the presence of potassium amide of dihydroisolysergamide II, prepared by hydrogenation of isolysergamide in acetic acid in the presence of platinum; to yield the nitrile of 1-methyl-dihydroisolysergic acid II.

*Example 5*

This example illustrates the use of one of the compounds of our invention as an intermediate in the production of an oxytocic substance.

*Dihydro-lysergamine I from the nitrile of dihydrolysergic acid I:*

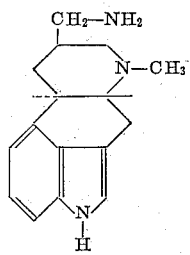

To a suspension of 0.800 g. of lithium aluminum hydride in 50 cc. of anhydrous tetrahydrofuran; a solution of 0.500 g. of the nitrile of dihydrolysergic acid I, melting at 273–276° C. (with decomposition) and prepared as described in Example 1, in 50 cc. of anhydrous tetrahydrofuran, is added over a period of 20 minutes at an internal temperature of 40° C. The resulting mixture is kept under stirring for 90 minutes at an internal temperature of 55–60° C., refluxed for 60 minutes, and cooled in a refrigerating bath. The excess of lithium aluminum hydride is then cautiously decomposed with water, with good stirring of the mixture during 30 minutes. Chloroform is added and the mixture filtered, and the filter with the residue thereon is washed many times with chloroform. The chloroform extracts are collected and washed with water, dried over anhydrous sodium sulfate and evaporated to dryness in vacuo. The yellowish solid residue is taken up in the warm with a small amount of ethyl ether, filtered, washed with ether and dried to yield 0.400 g. of dihydrolysergamine I, melting at 204–207° C. (with decomposition).

The same results are obtained, when the nitrile is reduced with sodium and an aliphatic alcohol, such as ethanol, instead of lithium aluminum hydride. Instead of separating the dihydrolysergamine I as such, its amide derivatives may be directly prepared.

The preparation of dihydroylsergamine I acetate can be carried out thus: The oily residue produced by the evaporation of the chloroform extracts and consisting of crude dihydroylsergamine is taken up with 7 cc. of pyridine and to this solution, cooled with an ice salt mixture, 1 cc. of acetyl chloride is added. After 10 minutes in the refrigerating mixture, the reaction mixture is kept for an additional 10 minutes at room temperature, then diluted with chloroform and a small amount of methanol, poured into a separating funnel containing ice-water and extracted with chloroform. The chloroform extracts collected are successively washed with a solution of 2% of sodium hydroxide and with water, then dried over anhydrous sodium sulfate and finally evaporated to dryness in vacuo. The red orange amorphous residue, dissolved in warm acetone and decolorized with charcoal is concentrated and diluted with petroleum ether. The acetate of dihydrolysergamine I crystallizes and on recrystallization from acetone and petroleum ether the product melts at 150–152° C.;

$[\alpha]_D^{20} = -70°$ (c.=0.2 in pyridine).

We claim:
1. A compound of the formula:

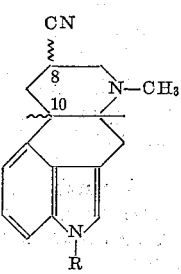

wherein R is selected from the group consisting of hydrogen and methyl, and both the cyano-group in the 8-position and the hydrogen atom in the 10-position have a configuration selected from the group consisting of α and β, the configuration of the cyano-group differeing from the configuration of the 10-position hydrogen 2. The nitrile of dihydrolysergic acid I.
3. The nitrile of 1-methyl-dihydrolysergic acid I.
4. The nitrile of dihydroisolysergic acid II.
5. The nitrile of 1-methyl-dihydroisolysergic acid II.
6. A process of producing ergoline derivatives having the formula:

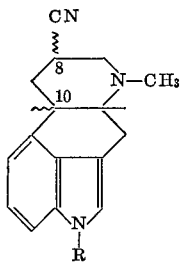

wherein R is selected from the group consisting of hydrogen and methyl, and the cyano-group in the 8-position and the hydrogen atom in the 10-position both have a configuration selected from the group consisting of α and β, the configuration of the cyano-group differeing from the configuration of the hydrogen atom in the 10-position, which comprises dehydrating the corresponding 8-carboxamido-ergoline, suspended in a tertiary amine, with an arylsulfohalide.

7. The process according to claim 6 in which the dehydration starts at from 25° C. to 35° C. and is completed at from 50° C. to 100° C.

8. A member of the group consisting of the nitrile of 9,10-dihydro-D-lysergic acid I and the nitrile of 1-methyl 9,10-dihydro-D-lysergic acid I.

9. A process for producing a member of the group consisting of the nitrile of 9,10-dihydro-D-lysergic acid I and the nitrile of 1-methyl-9,10-dihydro-D-lysergic acid I, which comprises dehydrating the corresponding 8-carboxamidoergoline, suspended in pridine, with toluene sulfonic acid chloride.

No references cited.

NICHOLAS S. RIZZO, *Primary Examiner.*
WALTER A. MODANCE, *Examiner.*
DON M. KERR, *Assistant Examiner.*